United States Patent [19]

Ozawa et al.

[11] Patent Number: 4,943,326

[45] Date of Patent: Jul. 24, 1990

[54] ORNAMENT AND METHOD OF MANUFACTURING THE SAME

[75] Inventors: Kazuhiro Ozawa, Yokohama; Etsuo Nakajima, Nagoya; Isao Yamaguchi, Mie, all of Japan

[73] Assignees: The Furukawa Electric Co., Ltd., Tokyo; Yamaguchi Pearl, Co., Ltd., Mie, both of Japan

[21] Appl. No.: 260,030

[22] Filed: Oct. 20, 1988

[30] Foreign Application Priority Data

Oct. 23, 1987 [JP] Japan .................. 62-267959

[51] Int. Cl.$^5$ .............................................. C22F 1/10
[52] U.S. Cl. ............................ 148/11.5 N; 148/402; 420/902
[58] Field of Search ............. 148/402, 11.5 N, 11.5 R; 420/902

[56] References Cited

U.S. PATENT DOCUMENTS 3,174,851  3/1965  Buchler et al. ................. 148/402

Primary Examiner—R. Dean
Attorney, Agent, or Firm—Oblon, Spivak, McClelland, Maier & Neustadt

[57] ABSTRACT

An ornament is disclosed, which is characterized in that a metallic alloy wire provided with a characteristic to show the superelastic effect at room temperature by making the metallic texture Austenite phase is overlapped on both ends and formed into an approximately circular ring shape to form a wound ring. A method of manufacturing the same claimed is that a prime wire of Ni—Ti type alloy is submitted to the cold processing rating from 20 to 50% to form a round or angular wire rod, said wire rod is wound up around a stick or pipe with a fixed outer diameter and submitted to the heat treatment at 300° to 600° C. under restraint of both ends of wire rod to form a wound ring of approximately circular ring shape and simultaneously the superelastic effect is given to said ring at room temperature by making the metallic texture thereof Austenite phase.

5 Claims, 2 Drawing Sheets

ORNAMENT AND METHOD OF MANUFACTURING THE SAME

BACKGROUND OF THE INVENTION

The present invention relates to an improvement in the ornaments. In particular, the invention provides a new function to the ornaments by giving a new function of superelasticity to wound ring component to be worn.

There are bracelets, rings, necklaces, etc. as the ornaments. In the cases of bracelet etc., the putting-on of said bracelet etc. has been performed traditionally by allowing a pair of clasps on both ends of core wire to engage with each other in a state of the core wires such as string, chain, etc. being wound up around the arm etc. Also, in recent, there is such one that permits the putting-on without using the clasps on both ends of core wire by allowing both ends to overlap and by winding in an approximately circular ring shape using spring materials with restorative property of piano wire or stainless steel wire.

With the bracelet etc. used the clasps on both sider of core wire, there are problems as follows:

(a) Because the putting-on and the taking-off of bracelet etc. are performed through the engagement of clasps, the putting-on and the taking-off of said bracelet etc. are very troublesome.

(b) Because the both ends of bracelet etc. formed into a size of fixed length are fastened through the crasps, there occurs an inconvenience that the bracelet etc. cannot be put on the arm etc. of other person when they are made metering the thickness of arm etc. of a particular wearer.

(c) Because the crasps are used, there is a drawback that the appearance as an ornament is injured by said clasps.

Moreover, with the bracelet etc. of approximately circular wound ring from which the crasps are detached by using spring materials with restorative property, such points that the putting-on and the taking-off are simple, the permissible range in the thickness of arm etc. is wide, the crasps injuring the appearance can be detached, and the like are improved. However, due to that the quantity of elastic strain of spring material made of piano wire or stainless steel wire is as low as about 0.5%, that the elastic stress is high, and the like, a large force is necessary to expand the circular ring. Moreover, due to a large tightening force on the arm etc., the fit cannot be made sufficient tending to occur unpleasant feeling. Still more, if repeating the expansion and the restoration of circular ring, it tends not only to become large but also to break.

For these reasons, the advent of approximately circular ring-like bracelet etc. with which the putting-on and the taking-off can be made without using the crasps etc. injuring the appearance, large force is not needed to expand the circular ring, yet the fit is sufficient to give a comfortable feeling of fitness when putting on the arm etc., and still the permissible range in the thickness of arm etc. is very wide has been desired.

The invention has been made to solve the technical problems as described above.

SUMMARY OF THE INVENTION

The first of the invention is an ornament characterized in that a metallic alloy wire provided with a characteristic to show the superelastic effect at room temperature by making the metallic texture Austenite phase is overlapped on both ends and formed into an approximately circular ring shape to form a wound ring, and the second of the invention is a method of manufacturing the ornament characterized in that a prime wire of Ni—Ti type alloy is submitted to the cold processing reduction from 20 to 50% to form a round or angular wire rod, said wire rod is wound up around a stick or pipe with a fixed outer diameter and submitted to the heat treatment at 300° to 600° C. under restraint of both ends of wire rod to form a wound ring of approximately circular ring shape and simultaneously the superelastic effect is given to said ring at room temperature by making the metallic texture thereof Austenite phase.

DETAILED DESCRIPTION OF THE INVENTION

In the first place, the constitution and the effect of the first invention will be explained.

In the invention, the reason why a metallic alloy wire provided with the characteristic to show the superelastic effect at room temperature by making the metallic texture Austenite phase is formed into a wound ring is as follows:

By providing beforehand a large strain-restoring characteristic, so-called superelastic characteristic (both characteristics of restoring characteristic amounting several percents due to the superelasticity and characterixtic capable of restoring by a fixed stress as the case of rubber) to the metallic alloy wire to be used for the wound ring, it is possible to make the ornament, with which the crasps become unnecessary resulting in the removal of nuisance of putting-on and taking-off due to the crasps, the appearance becomes better as a result of detaching the crasps, the permissible range in the thickness of arm etc. becomes very wide, yet comfortable feeling of fitness can be given, and, in addition, even if repeating the expansion and the restoration of the diameter of ring many times, there occurs no breaking and the diameter of ring is also hard to change.

As the metallic alloy wires to be used here, to which the superelastic characteristic is given, besides Ni—Ti alloy, Ni—Ti—Cr alloy, Ni—Ti—Fe alloy and Ni—Ti—Co alloy, Cu—Al—Ni alloy, Cu—Zn—X(X=Si, Sn, Al, etc.) alloy and the like are possible for use, but Ni—Ti type alloys are most suitable in the points of superelastic characteristic, corrosion resistance, light weight, etc.

Concrete alloy compositions suitable for the invention are Ni (50.7-51.5 at %)-Ti(49.3-48.5 at %) alloy (hereinafter, at % is omitted), Ni(48.0-51.0)-Ti(50.0-48.5)-Cr(0-2.5) alloy and Ni(47.0-51.0)-Ti(50.5-48.5)-Fe(0-2.5) alloy.

Moreover, in the invention, room temperature means a range from about 0° C. to the body temperature (36° C.). Furthermore, a statement that the superelastic effect is shown at room temperature means a phenomenon wherein several percents of strain are generated when applying the stress at room temperature and the strain restores to 0 when removing the stress. Still more, the reason why the etxture of metallic alloy wire was made Austenite phase at room temperature is for the provision of superelastic effect to metallic alloy wire. The alloys of Ni—Ti type etc., so refering here, are undergone the phase transformation from Martensite phase to Austenite phase through the increase in temperature, but, in the case of metallic alloy wire for ring according to the invention, it is desirable to establish the Af point (a temperature to complete the transformation to Austenite phase) to not higher than 0° C. This is because of that the alloy wire comprising Martensite phase at room temperature is soft and do not show the effect of superelasticity.

Figure 3:
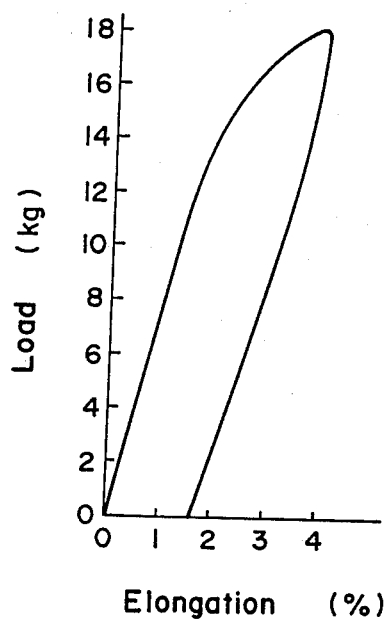
FIG. 3 is a relationship between stress and strain of Ni49.4-Ti49.4-Fe1.2 (at % each) alloy at an elastic state of hardening treatment type.
Figure 4:
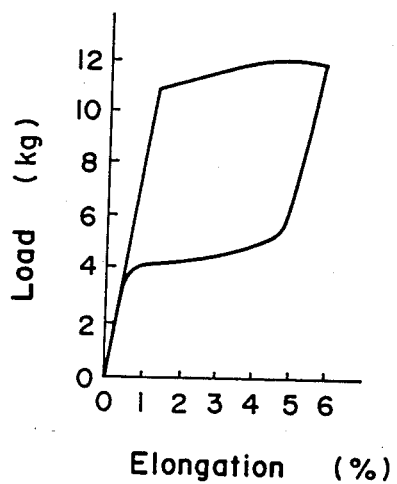
FIG. 4 is a relationship between stress and strain of the same alloy at a superelastic state.

Here, explanation will be made about the elasticity of hardening treatment type and the superelasticity. For example, as shown in FIG. 3, the stress-strain curve of one obtained by giving the treatment as intense as 30% to Ni49.9-Ti9.4-Fe1.2 alloy shows the elasticity of hardening treatment type having 4% elongation at ordinary temperature under a load of 18 kg. When decerasing the load to 0, however, 1.6% strain remains showing no superelasticity. WHereas, if submitting this material to the heat treatment for 1 hour at a temperature of 500° C., 6% elongation is exhibited at room temperature under a load of about 12 kg, as shown in FIG. 4, and, when decreasing the load to 0, the elongation returns to 0 coming to have the superelasticity.

The gist of the invention lies in that a metallic alloy wire provided with the characteristic to show the superelasticity at room temperature or a temperature of not lower than about 0° C. is formed into a wound ring component to make the ornaments such as bracelet, ring, necklace, etc. In this case, the shape of the section of alloy wire may be round or angular. Moreover, in the invention, pearls or other ornamental articles are attached to such wound ring, or the surface treatments such as gold plating etc. are given to said ring to enhance the balue added.

Next, the constitution and the effect of the second invention being a method of manufacturing the ornaments will be explained.

The constitution of the invention is as described above, and the reason why said Ni—Ti type alloys such as Ni—Ti alloy, Ni—Ti—Cr alloy, Ni—Ti—Fe alloy, Ni—Ti—Co alloy, etc. are used as the alloy wire rods is because of that they are overall superior as the ornaments in respective points of superelastic characteristic after the heat treatment, corrosion resistance on light weight.

Moreover, the reason why said alloy wire rod is first submitted to the cold processing reduction from 20 to 50%, said wire rod is wound up around a stick or pipe with a fixed outer diameter and submitted to the heat treatment at 300° to 600° C. under restraint of both ends of wire is for providing the characteristic to show the superelastic effect to wire rod at room temperature (about 0°-36° C.) by making the metallic texture thereof Austenite phase. If the initial cold processing reduction is under 20% of the temperature of subsequent heat treatment is under 300° C. or over 600° C., the characteristic of superelasticity becomes poor.

Moreover, if the initial cold processing rate exceeds 50%, the processing of wire rod becomes difficult. Besides, the time for heat treatment is preferable to be 30 minutes to 2 hours.

According to the invention, the wire rod finished the cold processing is submitted to the heat treatment after wound up around a stick or pipe with a fixed outer diameter. Here, the fixed outer diameter means the shape of aiming ornament and is not confined to the values below. For example, the outer diameter is about 50 mm $\phi$ or so in the case of bracelet, 16 mm $\phi$ or so in the case of ring, or further the shape is a flat ellipse with a major axis of about 130 mm and a minor axis of about 100 mm of so.

Besides, the bracelet, necklace, etc. may be cut to a necessary number of turns, for example, 1.2 turns or 2.2 turns, or so to make the wound shape ring component after they were wound up in many turns around stick and submitted to the heat treatment, or they may be wound up around stick etc. and submitted to the heat treatment fixing both ends thereof after they were cut to a fixed length (for example, 1.2 turns or 2.2 turns). In the cases of ring etc. the latter is sametimes preferable.

The heating in the heat treatment aforementioned is carried out by using electric furnace etc., for example, when heating whole ring components of the ornaments such as bracelet, ring, etc. under same conditions, while it is carried out by the methods such as electric heating, gas flame heating, etc., which permit to heat locally, for example, when heating each portion of ring components of the ornaments such as necklace etc. under different conditions.

As described, by combining the alloy composition with the processing and heat treatment conditions, it is possible to make the superelastic characteristic of ornament show at about 0° C. or higher. That is to say, the ring component of the ornament become to have the superelastic characteristic whenever it is worn.

If following, one example of the invention will be illustrated.

EXAMPLE 1

Figure 1:
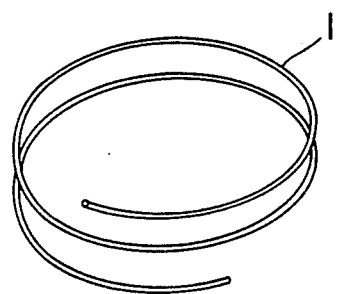
FIG. 1 and FIG. 2 (A) and (B) are external appearances showing one example of the invention, respectively.

A prime wire of Ni49.4-Ti49.4-Fe1.2 (at % each) with a wire diameter of 0.84 mm was subjected to cold drawing and to intermediate annealing by cold processing reduction to about 30% and then formed into a wire diameter of 0.7 mm $\phi$. This wire with 0.7 mm $\phi$ was wound around a stick with 50 mm $\phi$ and, restraining both ends of wire, it was heated for 60 minutes in an electric furnace of 500° C. to process the wire rod so that it shows the superelastic characteristic at 0° C. or higher. The Af point of this wire rod was 0° C. The wire rod manufactured in this way was cut to make a ring component with a diameter of 50 mm $\phi$ and number of turns of 2.2 as shown in FIG. 1. When loading this ring component at 20° C. to expand the diameter of ring from 50 mm $\phi$ to 100 mm $\phi$ and then unloading, the diameter returned to original 50 mm $\phi$. As a result of having repeated such test 1000 times, the diameter of ring remained to be 50 mm $\phi$ and proved not to deteriorate.

COMPARATIVE EXAMPLE 1

A stainless steel wire with a wire diameter of 0.7 mm $\phi$, which had been submitted to the cold processing, was wound up around a stick to make a ring component (comparative article 1) with a diameter of 50 mm $\phi$ and a number of turns of 2.2 as shown in FIG. 1. Also, a 30% cold processed wire with a wire diameter of 0.7 mm, which comprises Ni49.4-Ti49.4-Fe1.2 (at % each) alloy, was wound up around a stick to make a ring component (comparative article 2) with a diameter of 50 mm φ and a number of turns of 2.2.

When loading these comparative articles 1 and 2 at 20° C. to expand the diameter of rings from 50 mm φ to 100 mm φ and then unloading, the diameter returned to original 50 mm φ, but, when repeating 30 times, it did not restore to origin.

Besides, in the case of stainless steel wire, a larger force was needed to expand the circular ring.

EXAMPLE 2

Figure 2A:
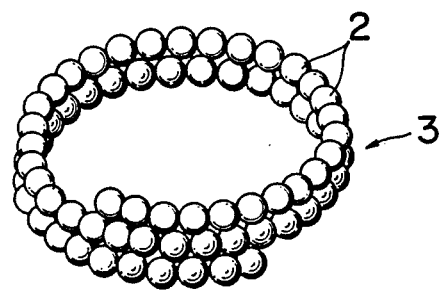

A prime wire of Ni49.5-Ti49.5-Cr1.0 alloy with a wire diameter of 0.84 mm was manufactured under similar conditions to Example 1 and, by heating for 60 minutes in an electric furnace of 550° C., a superelastic ring component (diameter: 50 mm φ) was name up. The Af point of this wire rod of ring component was −3° C. A double-turn bracelet (3) (inner diameter: about 45 mm φ) compactly threaded the pearls (2) on this ring component was made as shown in FIG. 2(A).

This bracelet (3) was expanded to an inner diameter of about 100 mm φ and put on the arm removing the load. At this time, the fit was sufficient without sliding down and comfortable feeling of fitness was obtained. Besides, the force to expand to 100 mm φ was slight. Moreover, when loading this bracelet at 20° C. expand the inner diameter from 45 mm φ to 100 mm φ and then unloading. The diameter returned to original 45 mm φ. As a result of having repeated such test 500 times, the inner diameter remained to be original 45 mm φ and proved not to deteriorate.

EXAMPLE 3

Figure 2B:
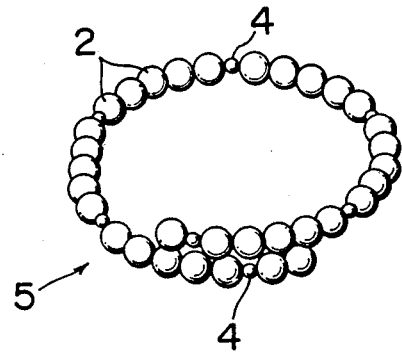

Similar treatments were given to the same Ni—Ti—Fe alloy wire as in Example 1 and a superelastic ring component with a diameter of 50 mm φ in a shape of winding of 1.2 turns was made up. A single-turn bracelet (5) disposed the pearls (2) and additionally other seven ornamental beads (4) in good appearance on said ring component was made as shown in FIG. 2(B).

This bracelet was excellent in external appearance since the crisps were not seen and the feeling when putting on the arm was also good.

Besides, this single-turn bracelet was tried to put on the arm and take off therefrom 100 times, but the deterioration of the feeling of fitness was not perceived proving to be good.

In accordance with the invention, due to the provision of the superelastic characteristic to the wound ring component of the ornament at room temperature by making the metallic texture thereof Austenite phase, this can be put on and taken off without using the crasps etc. The invention exerts therefore such excellent effects that the ornamental articles are excellent in the appearance, the permissible range in the thickness of arm etc. is also very wide, they fit perfectly to the arm etc. to produce comfortable feeling of fitness, yet the diameter of ring does not change despite the repeated putting-on and taking-off, and the like.

What is claimed is:

1. An ornament comprising: a superelastic Austenite metallic alloy wire which has an Af point not higher than about 15° C., said wire overlapping on the ends forming a wound ring.

2. The ornament of claim 1, wherein said superelastic metallic alloy wire is a Ni—Ti type alloy.

3. The ornament of claim 2 wherein pearls or other ornamental articles are attached to the wire.

4. The ornament of claim 2, wherein a surface treatment has been given to the ring.

5. A method of manufacturing the ornament of claim 1 comprising the steps: submitting a prime wire of Ni—Ti type alloy to cold processing reduction from 20% to 50% thereby forming a round or angular wire rod; winding said rod around a stick or pipe with a fixed outer diameter; heat treating said wound wire rod at 300° to 600° C. until an Austenite phase is formed in sufficient amount to give said ornament superelastic behavior at room temperature.

* * * * *